(12) United States Patent  (10) Patent No.: US 7,648,418 B2
Harnischfeger  (45) Date of Patent: Jan. 19, 2010

(54) TWIN-BALL JOINT

(75) Inventor: Heiko Harnischfeger, Freiensteinau-Weidenau (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 382 days.

(21) Appl. No.: 10/568,800

(22) PCT Filed: Jun. 12, 2004

(86) PCT No.: PCT/EP2004/006360

§ 371 (c)(1),
(2), (4) Date: Dec. 21, 2006

(87) PCT Pub. No.: WO2005/026567

PCT Pub. Date: Mar. 24, 2005

(65) Prior Publication Data

US 2007/0275784 A1    Nov. 29, 2007

(30) Foreign Application Priority Data

Aug. 18, 2003   (DE) ............................... 103 37 918

(51) Int. Cl.
  *F16D 3/224* (2006.01)
(52) U.S. Cl. .......................... 464/145; 464/906; 29/445
(58) Field of Classification Search ................ 464/145, 464/906; 29/428, 445
See application file for complete search history.

(56) References Cited

U.S. PATENT DOCUMENTS

| 5,509,856 | A | 4/1996 | Welschof |
| 5,685,777 | A | 11/1997 | Schwarzler |
| 2001/0024976 | A1 | 9/2001 | Ouchi et al. |
| 2004/0254021 | A1 | 12/2004 | Schwarzler |

FOREIGN PATENT DOCUMENTS

| DE | 42 34 488 C | 3/1994 |
| DE | 44 40 285 C1 | 4/1996 |
| DE | 100 33 491 A1 | 1/2002 |
| DE | 103 37 918 A1 * | 3/2005 |
| EP | 1 326 027 A1 | 7/2003 |

* cited by examiner

*Primary Examiner*—Greg Binda
(74) *Attorney, Agent, or Firm*—Rader, Fishman & Grauer, PLLC

(57) ABSTRACT

A constant velocity twin ball joint, having an outer joint part with outer ball tracks, an inner joint part with inner ball tracks. Circumferentially adjoining pairs of tracks comprise center lines of the outer and inner ball tracks which, when the longitudinal axes are aligned, are positioned in planes which extend parallel relative to one another and are symmetric relative to the longitudinal axes. A ball cage is positioned between the outer joint part and the inner joint part and comprises circumferentially distributed cage windows which each accommodate pairs of balls of adjoining pairs of tracks positioned in parallel planes. The circumferential length of second cage windows for second pairs of balls is smaller than the circumferential length of first cage windows for first pairs of balls.

3 Claims, 3 Drawing Sheets

X2' < X2
=> A2 > A1

$X2 > X2'$

TWIN-BALL JOINT

BACKGROUND

The invention relates to a constant velocity joint in the form of a twin-ball joint. Such joints have the following characteristics: an outer joint part which comprises a first longitudinal axis L12 as well as an attaching end and an aperture end positioned axially opposite one another, and which comprises outer ball tracks (22); an inner joint part which comprises a second longitudinal axis L13 and attaching means for a shaft pointing towards the aperture end of the outer joint part, and which comprises inner ball tracks; the outer ball tracks and the inner ball tracks form pairs of tracks with one another which each accommodate balls; circumferentially adjoining pairs of tracks comprise center lines of the outer and inner ball tracks which, when the longitudinal axes L12, L13 are aligned, are positioned in planes E, E' which extend parallel relative to one another and are symmetric relative to the longitudinal axes; and a ball cage positioned between the outer joint part and the inner joint part and comprising circumferentially distributed cage windows which each accommodate pairs of balls of adjoining pairs of tracks positioned in parallel planes.

When assembling fixed joints it is common practice first to insert the outer joint part, the ball cage and the inner joint part into one another and then the balls while over-articulating the joint so to speak, i.e. articulating the inner joint part and outer joint part relative to one another in such a way that each cage window of the cage guided on to half the articulation angle between the inner joint part and the outer joint part emerges from the outer joint part. Such over-articulation results in that those balls which have already been mounted and which are not positioned in the articulation plane nor in a plane extending through the ball cage axis which plane is positioned perpendicularly relative to the articulation plane are displaced in the circumferential direction of their cage windows. The greater the angle of articulation, the greater the circumferential length of the respective cage windows has to be. Lengthening the cage windows results in a reduction in the width of the webs between the cage windows. This, in turn, results in a reduction in the strength of the cage, which is undesirable.

For a constant velocity fixed joint whose pairs of tracks are positioned in radial planes and widen jointly towards the aperture of the outer joint part, it is known from U.S. Pat. No. 5,509,856 to propose a cage which comprises cage windows positioned opposite one another in a radial plane and having a first smaller circumferential length as well as cage windows whose centres are positioned outside said radial plane and a plane extending perpendicularly relative thereto and which comprise a second greater circumferential length.

SUMMARY OF THE INVENTION

The present invention provides an improved constant velocity joint in the form of a twin-ball joint whose cage comprises an increased strength. Specifically, the ball cage comprises circumferentially distributed cage windows which each accommodate pairs of balls of adjoining pairs of tracks positioned in parallel planes E, E', and the circumferential length X2' of second cage windows for second pairs of balls is smaller than the circumferential length X2 of first cage windows for first pairs of balls. This permits a method of assembly wherein, first, first pairs of balls are mounted one after the other in first cage windows and wherein then second pairs of balls are mounted one after the other in the second cage windows. For mounting said second pairs of balls in the second cage windows there is required a smaller circumferential length of the respective cage windows than needed for the movement of the first pairs of balls in the first cage windows during the mounting of the second pairs of balls. As a result of this and by halving the number of windows to half the number of balls and by aligning adjoining pairs of tracks relative to planes E, E' extending parallel relative to one another, there is achieved a widening of the webs between the ball windows and thus an increase in the cage strength.

The outer joint part, at its attaching end, comprises a joint base with an attaching journal or even a flange face with a further second aperture positioned opposite the first aperture.

The advantages of the invention are particularly obvious in joints with a larger number of balls, i.e. with eight or ten balls, in the case of which the web width of prior art joints is particularly reduced. The invention can be applied to joints whose number of balls can be divided by four. For arranging the first pairs of tracks and the second pairs of tracks of joints with different numbers of balls, reference is made to the following description of the drawings.

BRIEF DESCRIPTION OF THE DRAWINGS

Preferred embodiments of the invention are illustrated in the drawings and will be described below.

DETAILED DESCRIPTION OF THE DRAWINGS

Figure 1:
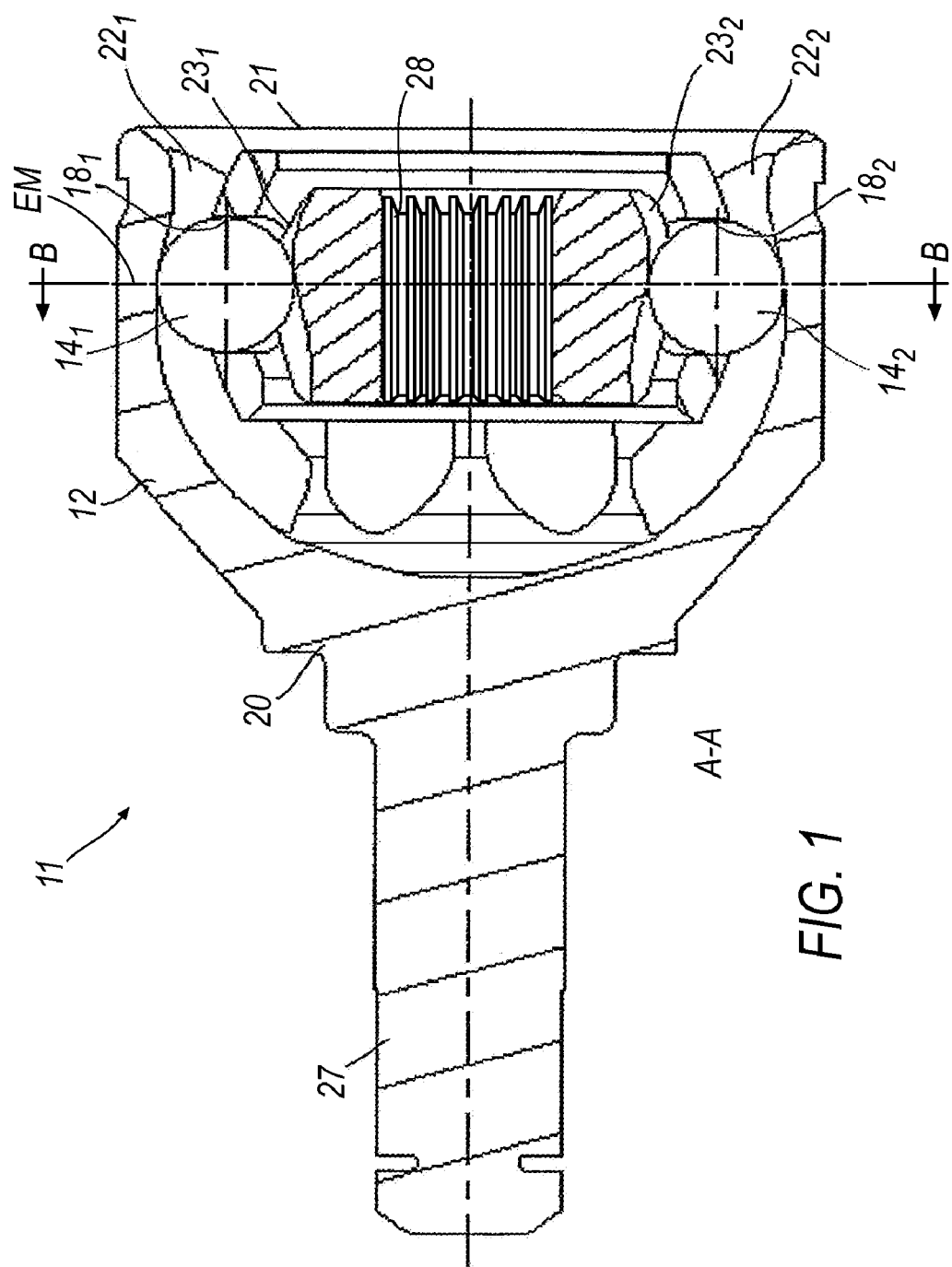
FIG. 1 is a longitudinal section through an inventive joint.

FIG. 1 is a longitudinal section through an inventive joint 11 which is shown to comprise an outer joint part 12 with a base 20 and a joint aperture 21 as well as an inner joint part 13 with an inner aperture 28 for a shaft journal to be inserted into same. A shaft journal 27 is formed-on to the base 20 of the outer joint part. The section shown extends parallel relative to the longitudinal axes L12 of the outer joint part and L13 of the inner joint, which can be seen later. In said section, it is possible to identify outer ball tracks $22_1$, $22_2$ in the outer joint part 12 and inner ball tracks $23_1$, $23_2$ in the inner joint part 13. Said tracks form pairs of tracks $22_1$, $23_1$, $22_2$, $23_2$ in which there run balls $14_1$, $14_2$. In the joint center plane EM in which there are positioned the ball centers with corresponding longitudinal axes L12, L13, the pairs of tracks widen from the aperture 21 to the base 20. A ball track design which is mirror-symmetric relative to the joint center plane EM—as compared to the ball tracks shown here—is also conceivable. The balls are held by a ball cage 16 in a common plane which, in this case, corresponds to the joint center plane EM. The balls are received by windows in the ball cage 16 of which there are shown first windows $18_1$, $18_2$.

Figure 2B:
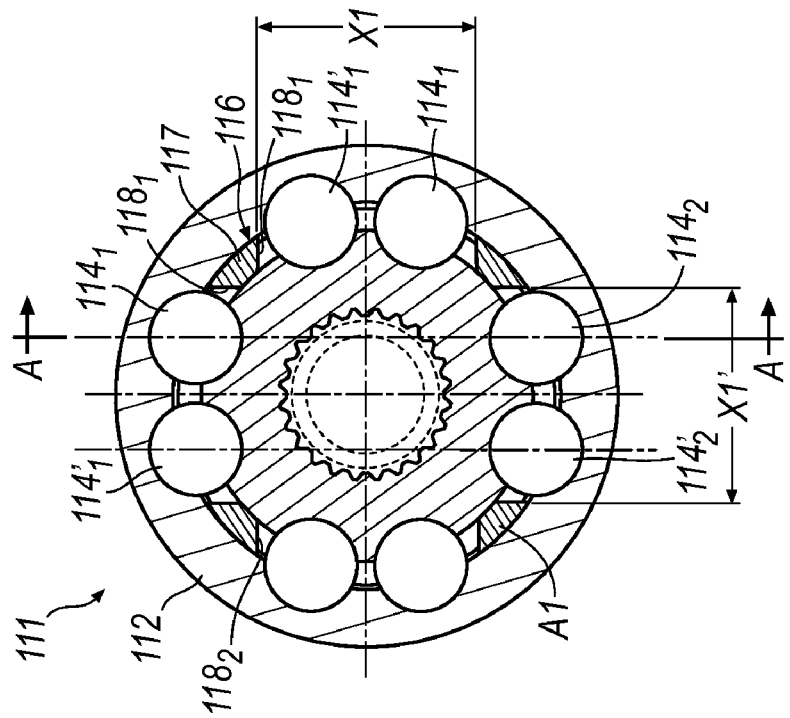
FIG. 2 shows the joint according to FIG. 1 in a cross-section through the ball cage
  a) in accordance with the invention,
  b) according to the state of the art.
Figure 2A:
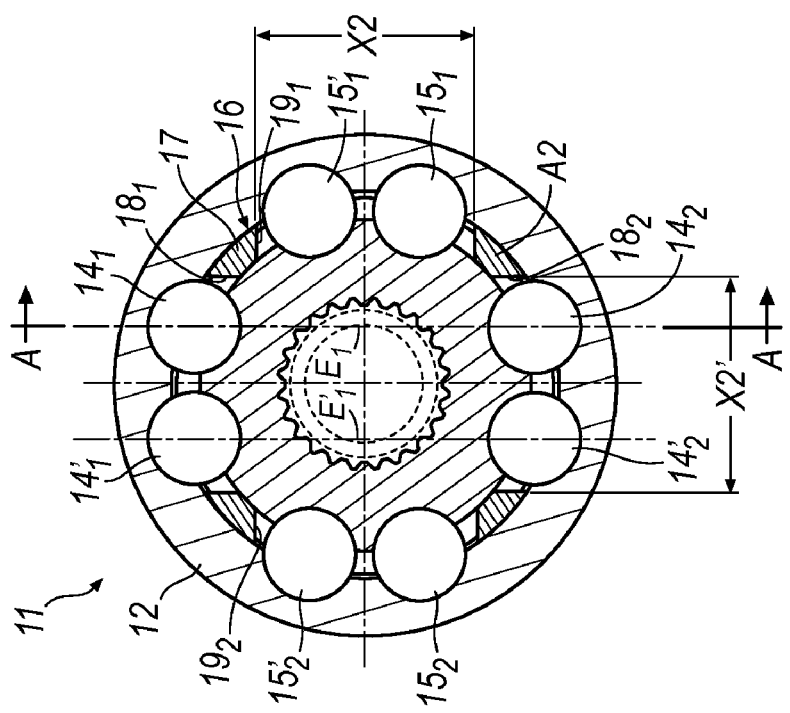
Figure 3C:
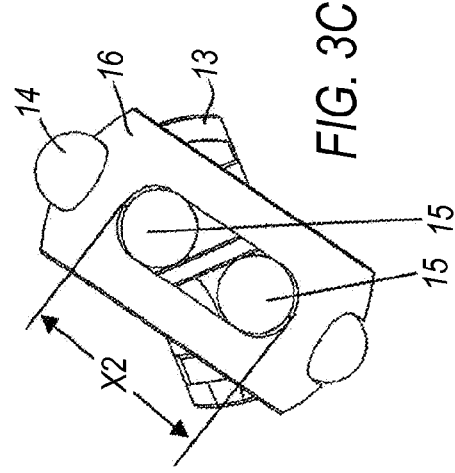
FIG. 3 shows an inventive joint during different assembly phases
  a) in a side view
  b) in an axial view of the joint aperture
  c) in a side view of the ball cage and the inner joint part
  d) in an axial view of the cage and the inner joint part.
Figure 3D:
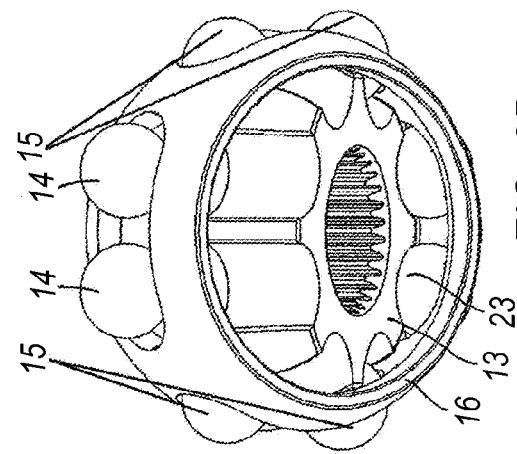
Figure 3A:
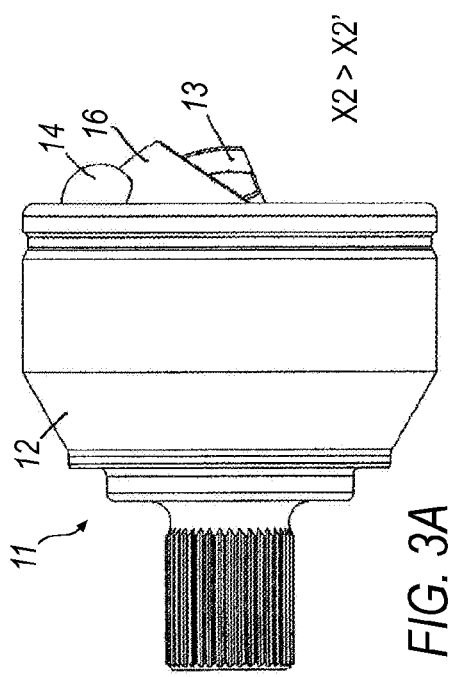
Figure 3B:
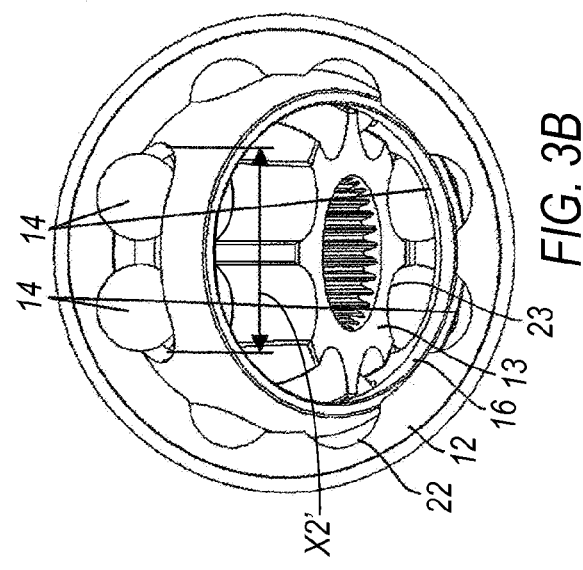

The two illustrations of FIG. 2 will be described jointly below. FIG. 2a shows a joint according to the invention and FIG. 2b a joint according to the state of the art. The reference numbers of the joint shown in FIG. 2a have been increased by 100. The cross-sectional plane shown corresponds to the section plane B-B of FIG. 1.

Again, the joint 111 is shown to comprise the outer joint part 112 and the inner joint part 113 with outer ball tracks and inner ball tracks in which there are received pairs of balls. Between the joint components it is possible to see the ball cage 116 with cage windows. The sectional plane A-A as shown in the illustrations is at the same time one of the planes $E_1, E_{1'}$ in which there extend the center lines of pairs of tracks which receive the balls 114, 114" of the second pairs of balls. The planes $E_1, E_{1'}$ are positioned perpendicularly relative to the drawing plane, i.e. parallel to and symmetrically relative to the longitudinal axes L12, L13, with corresponding longitudinal axes. In contrast to the joint 111 according to the state of the art according to FIG. 2b wherein the circumferential length of all cage windows 118 is the same, with the web width A1 of the webs 117 between the individual cage windows being the same relative to one another and greatly reduced, the joint in accordance with the invention according to FIG. 2a is shown to comprise first cage windows 19 with a circumferential length X2 and first pairs of balls 15, 15' and second cage windows 18 with a smaller circumferential length X2' and second pairs of balls 14, 14'. As will be explained below, first the longer cage windows 19 with the circumferential length X2 are provided with first balls 15 and then the second cage windows 18 having the shorter circumferential length X2' are provided with the second balls 14. By reducing the circumferential length of the cage windows 18, the circumferential length of the webs 17 increases on one side, so that there is obtained a web width A2>A1. In each case, said increase takes place on one side of each of the webs shown here, so that the strength of the cage as a whole is uniformly increased.

The different views and illustrations of FIG. 3 show the final phase of the assembly of the joint in the course of which the inner joint part 13 and the ball cage 16 are articulated relative to the outer joint part 12, with the situation of the so-called over-articulation also being shown wherein one cage window emerges from the outer joint part in such a way that the balls 14 can be inserted into the cage windows 18 and into the inner ball grooves 23. The cage window emerging here is a second cage window 18 with a shorter circumferential length X2'. As can be seen in FIG. 3c, when over-articulating the joint, the already mounted first balls 15 are displaced in the longer cage windows 19 until they abut, with the length X2 of said cage windows 19 being determined by the dimension of over-articulation, which is necessary to be able to insert the balls 14 into the shorter cage windows 18. As can be seen in FIG. 3b, only the short length X2' of the cage windows 18 is required for directly inserting the balls 14 into the cage windows 18 and the inner ball grooves 23 which are positioned close to the articulation plane. Prior to the final assembly stage shown here, the opposed balls 14 had been inserted into their cage windows 18 in the same way. Prior to that, in two first assembly stages, under conditions of over-articulation, the first cage windows 19 were provided in the same way with balls 15, with the circumferential length of the second cage windows as yet without balls 15 at that stage, being of no significance for said assembly stages.

What is claimed is:

1. A constant velocity twin ball joint comprising:
    an outer joint part which comprises a first longitudinal axis and an attaching end and an aperture end positioned axially opposite one another, and outer ball tracks;
    an inner joint part which comprises a second longitudinal axis and an attaching mechanism for a shaft pointing towards the aperture end of the outer joint part, and inner ball tracks, the outer ball tracks and the inner ball tracks form pairs of tracks with one another which each accommodate balls, and circumferentially adjoining pairs of tracks comprise center lines of the outer and inner ball tracks which, when the first and second axes are aligned, are positioned in planes which extend parallel relative to one another and are symmetric relative to the first and second axes; and
    a ball cage between the outer joint part and the inner joint part and comprising circumferentially distributed cage windows which each cage window accommodates a pair of balls of adjoining pairs of tracks positioned in parallel planes, wherein side faces of each cage window, in a cross-sectional view through the ball cage, are parallel to said parallel planes, wherein the ball cage further comprises webs between the cage windows, wherein a circumferential length of second cage windows for second pairs of balls is smaller than a circumferential length of first cage windows for first pairs of balls, wherein the webs between the first and second cage windows have the same circumferential width, and wherein the circumferential length of the first cage windows is limited to a dimension required for mounting the second pairs of balls.

2. A joint according to claim 1, wherein the joint comprises an even number of at least eight balls.

3. A method of assembling a joint according to claim 1 comprising the steps of: inserting the first pairs of balls one after the other through the first cage windows of the joint while being over-articulated; and thereafter, inserting the second pairs of balls one after the other through the second cage windows of the joint while being over-articulated.

* * * * *

UNITED STATES PATENT AND TRADEMARK OFFICE
CERTIFICATE OF CORRECTION

PATENT NO. : 7,648,418 B2
APPLICATION NO. : 10/568800
DATED : January 19, 2010
INVENTOR(S) : Heiko Harnischfeger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this

Twenty-third Day of November, 2010

David J. Kappos
*Director of the United States Patent and Trademark Office*